J. E. TEDLOCK.
SUGAR BOWL.
APPLICATION FILED DEC. 29, 1916.
1,256,392.    Patented Feb. 12, 1918.
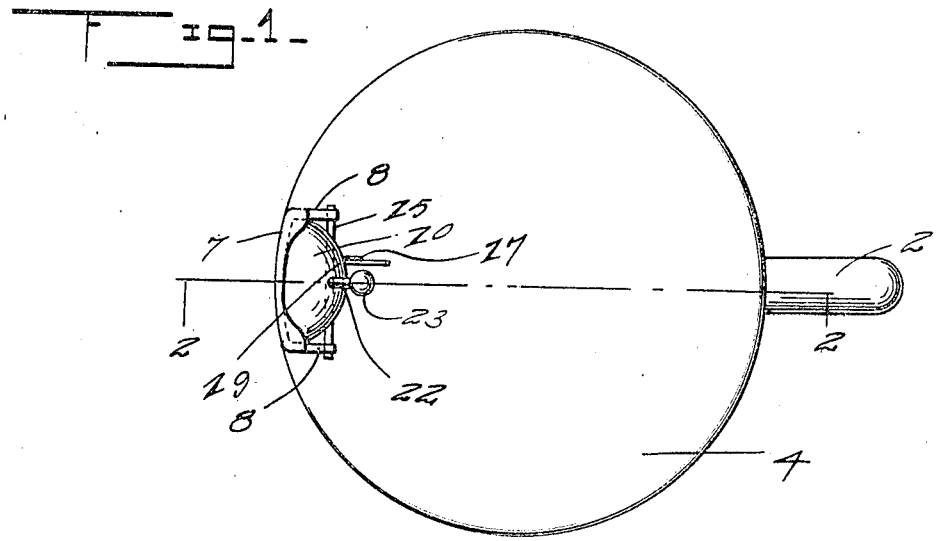
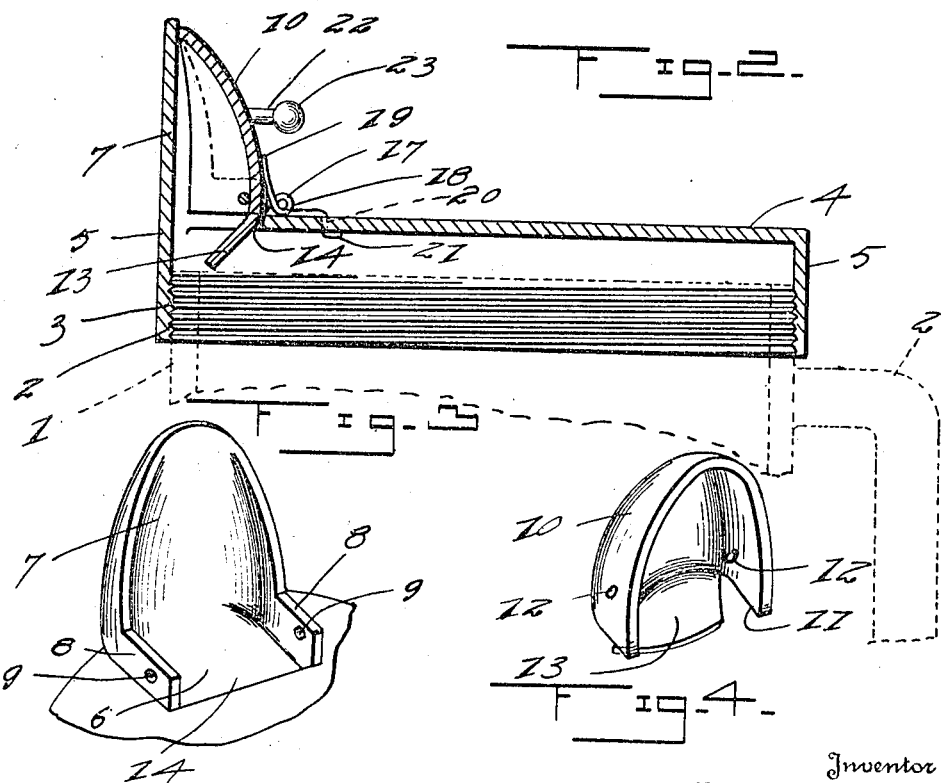
Witnesses
Inventor
J. E. Tedlock.

UNITED STATES PATENT OFFICE.

JACOB E. TEDLOCK, OF McFALL, MISSOURI.

SUGAR-BOWL.

1,256,392.

Specification of Letters Patent.

Patented Feb. 12, 1918.

Application filed December 29, 1916. Serial No. 139,492.

*To all whom it may concern:*

Be it known that I, JACOB E. TEDLOCK, a citizen of the United States, residing at McFall, in the county of Gentry and State of Missouri, have invented certain new and useful Improvements in Sugar-Bowls; and I do hereby declare the following to be a full, clear, and exact description of the invention, such as will enable others skilled in the art to which it appertains to make and use the same.

This invention relates to improvements in sugar bowls.

The object of this invention is the provision of a sugar bowl which has a removable top, which top is equipped with a spout and a hinged cover for the spout, which cover is so arranged as to be operated and prevent the contents of the bowl from passing into the spout when this cover is opened, and the bowl tilted.

A still further object of this invention is the provision of a bowl which has a removable top, which top is provided with a substantially spoon shaped spout and a cover for the spout and the cover being hingedly secured to the top and provided with an extension which is adapted to prevent the contents of the bowl from passing into the spoon shaped spout when in an open position and the bowl tilted thus providing means whereby a predetermined amount of material may be dispensed from the bowl into the spout.

A still further object of this invention is to provide a sugar bowl and top therefor of this character which will be simple, practical and comparatively inexpensive in construction and one that can be manufactured and sold at a low cost.

With these and other objects in view the invention consists in the novel combination and arrangement of parts hereinafter more fully described and set forth in the claim hereto appended.

In the drawings:

Figure 1 is a top plan view illustrating my improved sugar bowl as made in accordance with this invention, Fig. 2 is a sectional view taken on the line 2—2 of Fig. 1 illustrating a fragmentary portion of the bowl.

Fig. 3 is a perspective view of the spout, and

Fig. 4 is a perspective view of the cover for the spout.

Like numerals of reference designate corresponding parts in all the figures of the drawings.

Referring more particularly to the drawings, the numeral 1 designates a fragmentary portion of the upper part of a bowl, which bowl may be constructed of glass, or any other material suitable for the purpose. The bowl 1 is provided with a handle 2, which handle facilitates the lifting of the bowl for carrying the same, and also permits the bowl to be tilted the purpose of which will be hereinafter more fully described.

The bowl 1 is provided with exterior screw threads 2 which are adapted to have fitted thereon the screw threads 3 carried interiorly by the top 4. The top 4 is provided with a depending flange 5 which has arranged thereon and interiorly thereof the screw threads 3 which are adapted to fit the screw threads 2 of the bowl 1 to facilitate the removal of the top from the bowl to permit the bowl to be filled.

The top 4 is provided with a substantially rectangular opening 6 which extends through the periphery thereof and formed integrally with the periphery and front wall of the recess 6 and extending vertically therefrom is the spout 7, which spout is substantially spoon shaped or concavo-convex in cross section and is provided on its rear upper side longitudinal edges with lugs 8, which lugs are provided with alined transversely arranged openings 9. The lugs 8 are formed integrally with the side walls of the openings 6 at the lower ends thereof. The spoon shaped spout 7 is in communication with the interior of the bowl 1 so that when the bowl is tilted the contents of the bowl will freely pass into the body of the spout 7.

A spout cover 10 has a substantially spoon shaped body which is substantially concavo-convex in cross section and has its enlarged end fully opened as at 11, and the opposite side walls of the body 10 are provided with alined transverse openings 12. Formed from the body at the rear end thereof is an extension 13 which is inclined inwardly toward the concave face of the body and facilitates a closure, the purpose of which will be hereinafter more fully described.

The spout cover 10 is positioned upon the top 4 and has its extension 13 extending through the opening 6 into and below the top 4 thereof and the extension 13 being inclined in the direction of the concave face of the spout 7, which face opposes the concave face of the cover 10. The convex face of the cover 10 adjacent the rear open end thereof is located in close proximity to the rear wall 14 of the opening 6. The openings 12 of the cover 10 are adapted to aline with the openings 9 in the lugs 8 of the spout 7. A pivot pin 15 is extended transversely through the openings 9 and 12 of the spout and cover thus hingedly securing the cover to the spout. A flat spring 17 is looped at its medial portion as at 18 and has one of its arms secured to the convex face of the cover 10 as at 19 and its opposite end extended downwardly through the cover 4 as at 20, and has its extreme end 21 bent upwardly into engagement with the under side of the top 4 thus preventing any lateral shifting movement of the spring with relation to the top thereof, the spring 17 normally tending to hold the cover 10 into engagement with the spout 7 thus keeping the spout 7 in a clean and sanitary condition.

A handle member having a shank 22, which shank is secured to the convex face of the cover 10 centrally thereof and has formed on its outer end a ball 23 which facilitates the opening of the cover 10 against the tension of the spring 17 forcing the extension 13 into engagement with the flange 5 of the top 4 thus preventing but a predetermined amount of the contents of the bowl from passing into the spout 7 when the bowl is tilted.

In operation:

The bowl is grasped by the handle 2 by one hand of the operator and tilted forcing its contents into and upon the spout 7. When the spout 7 is filled the handle 23 is grasped by the operator moving the cover outwardly on its hinged pin and against the tension of the spring 17 forcing the extension into engagement with the flange 5 thus preventing the contents of the bowl from passing on the spout 7 and a predetermined amount may be obtained by the cutting off of further flow of the contents from the bowl 1 to the spout 7. After the contents have been removed from the spout 7 the operator releases the handle of the cover 10 and the cover 10 seeks its normal position by action of the spring 17.

What is claimed is:

A device of the class described including a body, a top removably connected to one end of the body, said top provided with a substantially rectangular opening, a spout formed integrally with the front wall of the opening and in communication with the body, lugs formed integrally with the opposite side longitudinal edges of the spout and side walls of the recess, said lugs provided with transversely alined openings, a cover provided with an extension, said extension arranged to extend through the opening and below the top, said cover pivotally secured to the lugs of the spout, spring means for holding the cover in engagement with the spout, means carried by the cover to facilitate the opening thereof against the tension of the spring means, said extension adapted to close the spout when the cover is in open position.

In testimony whereof I affix my signature in presence of two witnesses.

JACOB E. TEDLOCK.

Witnesses:
A. S. BLEISH,
B. R. TREASURE.

Copies of this patent may be obtained for five cents each, by addressing the "Commissioner of Patents, Washington, D. C."